United States Patent
Zhang et al.

(10) Patent No.: US 12,271,979 B2
(45) Date of Patent: Apr. 8, 2025

(54) BACKGROUND IMAGE GENERATION METHOD AND APPARATUS, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventors: Xi Zhang, Guangdong (CN); Yichang Li, Guangdong (CN); Bo Yan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 211 days.

(21) Appl. No.: 18/148,429

(22) Filed: Dec. 29, 2022

(65) Prior Publication Data
US 2023/0222706 A1 Jul. 13, 2023

Related U.S. Application Data

(63) Continuation of application No. PCT/CN2021/110248, filed on Aug. 3, 2021.

(30) Foreign Application Priority Data

Sep. 14, 2020 (CN) .......................... 202010963262.3

(51) Int. Cl.
*G06T 11/00* (2006.01)
*G06F 16/535* (2019.01)
(Continued)

(52) U.S. Cl.
CPC .......... *G06T 11/001* (2013.01); *G06F 16/535* (2019.01); *G06F 16/5838* (2019.01);
(Continued)

(58) Field of Classification Search
None
See application file for complete search history.

(56) References Cited

U.S. PATENT DOCUMENTS

| | | | |
|---|---|---|---|
| 2002/0018224 A1* | 2/2002 | Takemoto | H04N 1/622 358/1.9 |
| 2003/0025649 A1* | 2/2003 | Wynne Willson | H04N 9/3185 348/E5.143 |

(Continued)

FOREIGN PATENT DOCUMENTS

| | | |
|---|---|---|
| CN | 102360490 | 2/2012 |
| CN | 104732506 A | 6/2015 |

(Continued)

OTHER PUBLICATIONS

EPO, Extended European Search Report for EP Application No. 21865725.2, Nov. 8, 2023.
(Continued)

*Primary Examiner* — Anh-Tuan V Nguyen
(74) *Attorney, Agent, or Firm* — Hodgson Russ LLP

(57) ABSTRACT

A background image generation method, a non-transitory computer-readable storage medium and an electronic device. The background image generation method includes: acquiring a first image, searching a second image matching the first image in a preset image library; and performing a color-modulation process on the second image according to the first image, and generating a background image. The user's personalized demands regarding a background image are satisfied, and time and hardware costs for obtaining a background image are reduced.

16 Claims, 7 Drawing Sheets

(51) Int. Cl.
*G06F 16/583* (2019.01)
*G06T 7/11* (2017.01)
*G06V 10/74* (2022.01)

(52) U.S. Cl.
CPC .............. *G06T 7/11* (2017.01); *G06V 10/761* (2022.01); *G06T 2210/22* (2013.01)

(56) References Cited

U.S. PATENT DOCUMENTS

| | | | |
|---|---|---|---|
| 2010/0014781 A1* | 1/2010 | Liu | H04N 13/128 |
| | | | 382/285 |
| 2011/0242126 A1 | 10/2011 | Hoppe et al. | |
| 2012/0224787 A1* | 9/2012 | Imai | H04N 23/951 |
| | | | 382/274 |
| 2016/0063721 A1* | 3/2016 | Nakano | G06T 7/10 |
| | | | 382/173 |
| 2016/0275376 A1* | 9/2016 | Kant | G06F 18/2415 |
| 2017/0256040 A1* | 9/2017 | Grauer | H04N 23/631 |
| 2018/0374199 A1 | 12/2018 | Shen et al. | |
| 2019/0034734 A1* | 1/2019 | Yen | G06F 18/2413 |
| 2019/0340349 A1* | 11/2019 | Kong | G06F 21/32 |
| 2020/0104721 A1* | 4/2020 | Mori | G06V 10/761 |
| 2020/0106925 A1 | 4/2020 | Takasu et al. | |
| 2020/0143171 A1* | 5/2020 | Lee | G06V 20/49 |
| 2020/0314354 A1* | 10/2020 | Punja | G06F 16/583 |

FOREIGN PATENT DOCUMENTS

| | | |
|---|---|---|
| CN | 105335591 A | 2/2016 |
| CN | 106815826 | 6/2017 |
| CN | 109710791 A | 5/2019 |
| CN | 109754375 A | 5/2019 |
| CN | 110097604 A | 8/2019 |
| CN | 111429377 | 7/2020 |
| EP | 1973074 | 9/2008 |

OTHER PUBLICATIONS

Su et al., "Color Transfer Based on Texture Similarity," Packaging Journal, Jan. 2016, vol. 8, Issue 1.
WIPO, International Search Report for International Application No. PCT/CN2021/110248, Oct. 29, 2021.
Play Machine Life, Oppo Watch's "72 changes", one AI dial function is enough!, Baijiahao Baidu, Mar. 18, 2020.
CNIPA, First Office Action for CN Application No. 202010963262.3, Sep. 27, 2024.

* cited by examiner

BACKGROUND IMAGE GENERATION METHOD AND APPARATUS, STORAGE MEDIUM, AND ELECTRONIC DEVICE

CROSS REFERENCE TO RELATED APPLICATIONS

The present disclosure is a continuation of International Patent Application No. PCT/CN2021/110248, filed Aug. 3, 2021, which claims priority to Chinese Patent Application No. 202010963262.3, filed Sep. 14, 2020, the entire disclosures of which are incorporated herein by reference.

TECHNICAL FIELD

The present disclosure relates to the technical field of image processing, and in particular to a background image generation method, a computer-readable storage medium and an electronic device.

BACKGROUND

With the development of intelligent terminal devices, users' requirements on aesthetic aspects of the devices are higher and higher. The background of the device display interface has a greater impact on the aesthetics, and the user's demand for the background is more and more personalized and differentiated. How to obtain background images that satisfy the personalized demands of users is a technical problem that urgently needs to be solved.

SUMMARY

The present disclosure provides a background image generation method a computer-readable storage medium and an electronic device.

According to a first aspect of the present disclosure, a background image generation method is provided. The background image generation method includes: acquiring a first image; searching a second image matching the first image in a preset image library; and performing, according to the first image, a color-modulation process on the second image, and generating the background image.

According to a second aspect of the present disclosure, a non-transitory computer-readable storage medium is provided. The non-transitory computer-readable storage medium stores computer program thereon. When the computer program is executed by a processor, a background image generation method may be achieved. The background image generation method includes: acquiring a first image; searching a second image matching the first image in a preset image library; and performing, according to the first image, a color-modulation process on the second image, and generating the background image.

According to a third aspect of the present disclosure, an electronic device is provided. The electronic device includes a processor and a memory. The memory is configured to store executable instructions of the processor. The processor is configured to implement the executable instructions to implement a background image generation method. The background image generation method includes: acquiring a first image; searching a second image matching the first image in a preset image library; and performing, according to the first image, a color-modulation process on the second image, and generating the background image.

DETAILED DESCRIPTION

Figure 1:
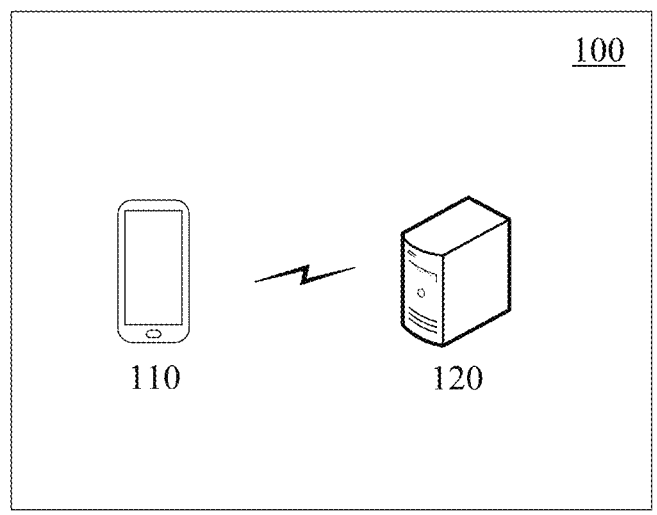
FIG. 1 is a schematic diagram of a system architecture according to an embodiment of the present disclosure.

The example embodiments will now be described more thoroughly with reference to the accompanying drawings. However, the example embodiments can be implemented in a variety of forms, and should not be construed as being limited to the examples set forth herein. These embodiments are rather provided to make the present disclosure more comprehensive and complete, and to communicate the ideas of the example embodiments to those skilled in the art in a comprehensive manner. The features, structures or characteristics described can be combined in one or more embodiments in any suitable manner. In the following description, many specific details are provided so as to offer a full understanding of the embodiments of the present disclosure. However, those skilled in the art will appreciate that, it is possible to practice technical schemes of the present disclosure while omitting one or more of the particular details described, or other methods, components, apparatuses, steps, etc. may be employed. In other situations, the well-known technical solutions are not shown or described in detail, to avoid providing too much noisy information and obscuring aspects of the present disclosure by making them noisy.

In addition, the accompanying drawings are only schematic illustrations of the present disclosure and are not necessarily drawn to scale. Identical references in the drawings indicate identical or similar parts, and thus repetitive descriptions thereof will be omitted. Some of the block diagrams shown in the accompanying drawings are functional entities, and do not necessarily correspond to physically or logically independent entities. These functional entities may be implemented in the form of software, in one or more hardware modules or integrated circuits, or in different networks and/or processor apparatuses and/or micro-control apparatuses.

The background images of a mobile phone generally include a lock screen background and a desktop background. The background image is one of the most common things users may see on their mobile phones during the daily use. On smart wearable devices, there are also various background images, such as dial images of smart watches. A dial image can even be kept constantly bright, making a smart watch to be a kind of decoration. It thus can be seen that, the background image has a great impact on user's aesthetic feelings.

In related technologies, a background image usually comes in two ways. In the first way, the background image is from the system's own background style, which generally includes a solid color background, a gradient ramp color background and a background with dynamic changed simple patterns. In the second way, the background image is from user-selected images. For example, the user selects a picture from an album, and sets it as the background. However, the background images from these two sources have certain limitations: the kinds of background styles provided by the system are very limited. Most of the pictures in the user's album are captured in daily life, which inevitably have photographic defects and are not suitable for background.

In view of the above problems, exemplary embodiments of the present disclosure provide a background image generation method. The background image generated by the background image generation method can be applied as: a lock screen background of a mobile phone or a tablet, a desktop background, a dial image of a smart watch, a background used for a device screen saver, etc.

FIG. 1 is a schematic diagram of a system architecture according to an embodiment of the present disclosure. As shown in FIG. 1, the system architecture 100 may include: a terminal device 110 and a server 120. The terminal device 110 may be a mobile phone, a tablet computer, a digital camera, a personal computer, a smart wearable device, etc. The method provided in embodiments of the present disclosure may be executed by the terminal device 110 alone. For example, after the terminal device 110 captures an image, a background image is generated by performing the background image generation method. The method provided in embodiments of the present disclosure may also be executed by the server 120 alone. For example, an image is captured by the terminal device 110 and then transferred to the server 120. The server 120 generates a background image by performing the background image generation method, and returns the background image back to the terminal device 110 for display. These are not limited in the present disclosure.

Exemplary embodiments of the present disclosure also provide an electronic device, which is configured to implement the above-mentioned background image generation method. The electronic device may be the terminal device 110 or the server 120 of FIG. 1. The electronic device at least includes a processor and a memory. The memory is configured for storing executable instructions of the processor. The memory is also configured for storing application data, such as image data etc. The processor is configured to implement the background image generation method via executing the executable instructions.

Figure 2:
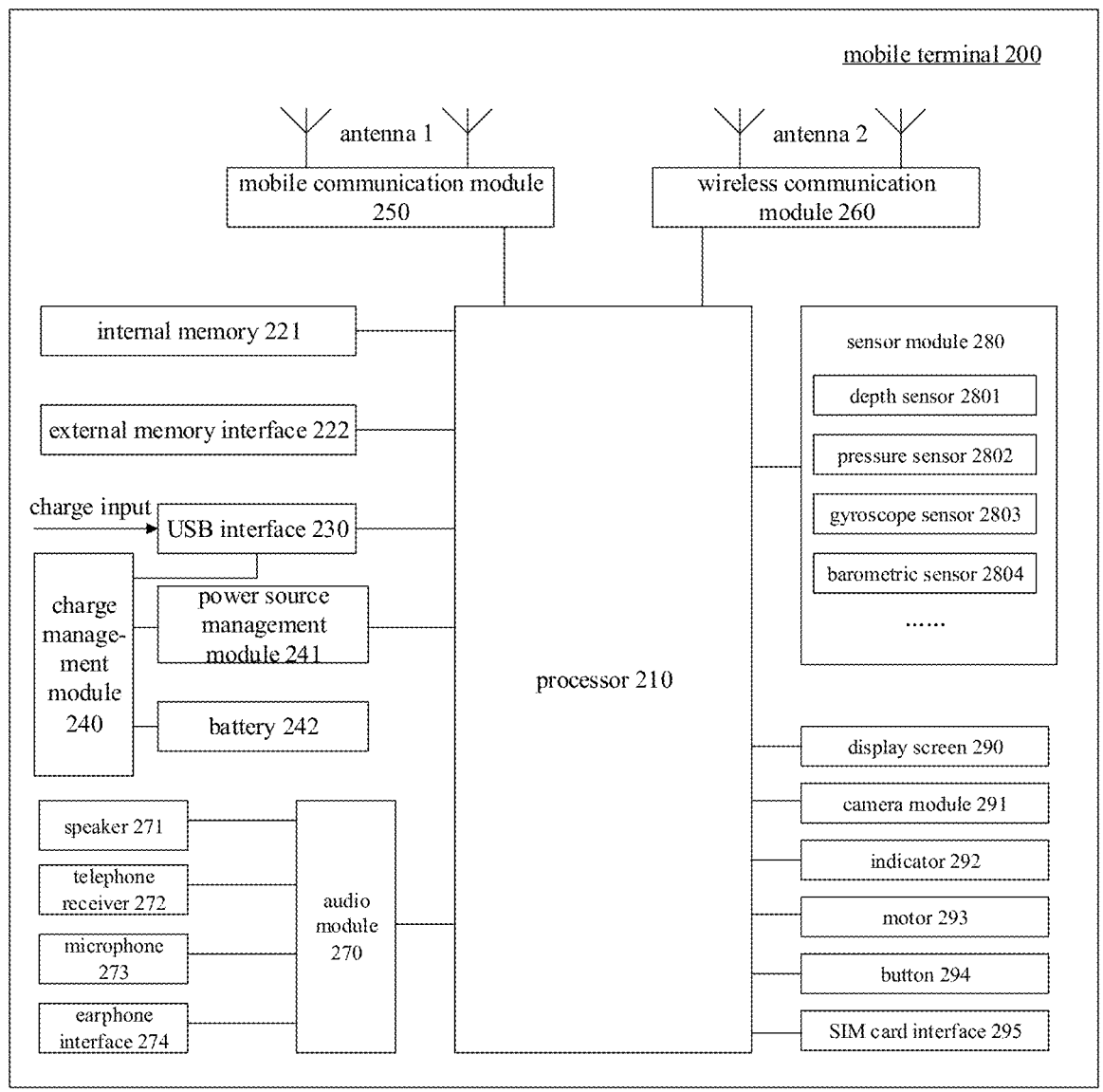
FIG. 2 is a structural diagram of an electronic device according to an embodiment of the present disclosure.

The following is an exemplary description of the construction of the above-mentioned electronic device, with the mobile terminal 200 of FIG. 2 as an example. It should be understood by those skilled in the art that, in addition to components used specifically for mobile purposes, the construction in FIG. 2 can also be applied to fixed types of equipment or immobilized equipment.

As shown in FIG. 2, the mobile terminal 200 may specifically include: a processor 210, an internal memory 221, an external memory interface 222, a USB (Universal Serial Bus) interface 230, a charge management module 240, a power source management module 241, a battery 242, an antenna 1, an antenna 2, a mobile communication module 250, a wireless communication module 260, an audio module 270, a speaker 271, a telephone receiver 272, a microphone 273, an earphone interface 274, a sensor module 280, a display screen 290, a camera module 291, an indicator 292, a motor 293, a button 294, and a Subscriber Identification Module (SIM) card interface 295, etc.

The processor 210 may include one or more processing units. For example, the processor 210 may include an application processor (AP), a modem processor, a graphics processing unit (GPU), an image signal processor (ISP), a controller, an encoder, a decoder, a digital signal processor (DSP), a baseband processor and/or a neural-network processing unit (NPU), etc. The AP, GPU, etc. may perform processing of image data, such as perform target detection, recognition of images, etc.

The encoder may encode (i.e., compress) the image or video data. For example, the mobile terminal 200 may compress the captured image and transmit the compressed data to the server, thereby reducing a bandwidth occupied by the data transmission. The decoder may decode (i.e., decompress) the encoded image or video data, to restore the image or video. The mobile terminal 200 may support one or more encoders and decoders. In this way, the mobile terminal 200 may process images or videos in multiple encoding formats, such as JPEG (Joint Photographic Experts Group), PNG (Portable Network Graphics), BMP (Bitmap), and other image formats, and MPEG (Moving Picture Experts Group) 1, MPEG2, H.263, H.264, HEVC (High Efficiency Video Coding) and other video formats.

In some embodiments, the processor 210 may include one or more interfaces. The processor 210 makes connections with other components of the mobile terminal 200 through different interfaces.

The external memory interface 222 may be configured to connect with an external memory card. The internal memory 221 may be configured to store computer executable program code. The internal memory 221 may also be configured to store data (e.g., images, videos) etc. that are created during use of the mobile terminal 200.

A USB port 230 is an interface that complies with the USB standard specification. The USB port 230 may be configured to connect with a charger to charge the mobile terminal 200. The USB port 230 may also be connected to an earphone or other electronic device.

The charge management module 240 is configured to receive charge input from the charger. While the charge management module 240 is charging the battery 242, the device may also be powered by the charge management module 241. The power management module 241 may also be configured to monitor the status of the battery.

The wireless communication function of the mobile terminal 200 may be implemented by the antenna 1, the antenna 2, the mobile communication module 250, the wireless communication module 260, the modem processor and the baseband processor, etc. The antenna 1 and the antenna 2 are configured to transmit and receive electromagnetic wave signals. The mobile communication module 250 may provide solutions for wireless communication applied to the mobile terminal 200. The wireless communication may include 2G/3G/4G/5G and the like. The wireless communication module 260 may provide solutions for wireless communication applied to the mobile terminal 200, the wireless communication may include the wireless local area network (WLAN) (e.g., Wireless Fidelity (Wi-Fi) network), the Bluetooth (BT), the Global Navigation Satellite System (GNSS), the Frequency Modulation (FM), the Near Field Communication (NFC), the Infrared (IR) technology and the like.

The mobile terminal 200 may implement a display function through the GPU, the display screen 290 and the application processor, etc. The mobile terminal 200 may implement the photo-capturing function through the ISP, the camera module 291, the encoder, the decoder, the GPU, the display screen 290 and the application processor, etc. The mobile terminal 200 may implement audio functions through the audio module 270, the speaker 271, the telephone receiver 272, the microphone 273, the earphone interface 274 and the application processor, etc.

The sensor module 280 may include a depth sensor 2801, a pressure sensor 2802, a gyroscope sensor 2803, a barometric sensor 2804, etc.

The indicator 292 may be an indicator light, which may be configured to indicate the charging status, battery level changes, or to indicate messages, missed calls, notifications, etc. The motor 293 may be configured to generate vibration alert, or may be configured for tactile vibration feedback, etc. The button 294 may include a power button, a volume button, etc.

The mobile terminal 200 may support one or more SIM card interfaces 295, for connecting with an SIM card.

Figure 3:
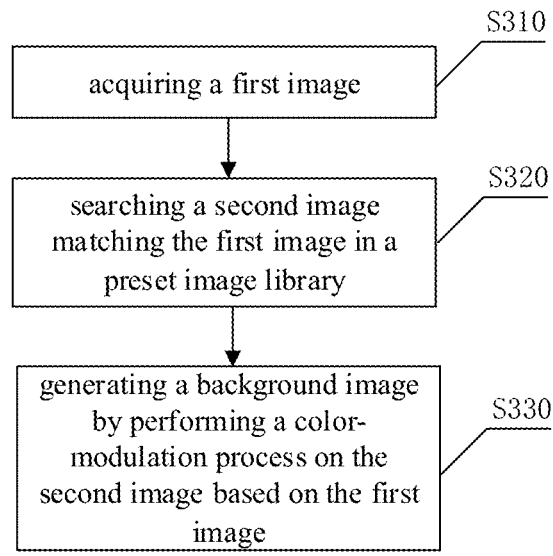
FIG. 3 is a flowchart of a background image generation method according to an embodiment of the present disclosure.

FIG. 3 illustrates an exemplary flowchart of a background image generation method. The background image generation method may include operations at blocks S310 to S330 as illustrated in FIG. 3.

At block S310: acquiring a first image.

At block S320: searching a second image matching the first image in a preset image library.

At block S330: generating a background image by performing a color-modulation process or toning process on the second image based on the first image.

Through the above-mentioned method, searching the second image matching the first image from the preset image library with the first image as a reference, and then performing the color-modulation process on the second image according to the first image, the second image subject to the color-modulation process is used as the background image. On the one hand, this exemplary embodiment proposes a new background image generation method that combines features of the first image and the second image. The first image represents the user's preferences in terms of image content and image color, the second image is a standardized image suitable for use as a background and has no defects such as jitter and noise that occurs during image capture. The resulted background image meets characteristics of pure background content and distinctive theme, and is able to meet the user's personalized demand, while brings the fun of changing the background. On the other hand, this solution is simple to implement, does not require a large number of user operations or complex image processing, and reduces the time and hardware costs for acquiring the background image.

Each of the operations in FIG. 3 is described in detail below.

At block S310, acquiring the first image.

The first image is a reference image for generating the background image. The first image is usually an image subjectively or initiatively specified by the user, and reflects the user's preference in terms of image content and image color. The first image includes, but is not limited to: an image captured by the user; an image selected by the user from the terminal device, such as an image downloaded via the network, an image in an album, etc.; and an image obtained by performing certain processing on the image captured or selected by the user. The first image may be of any type, such as a character image, a landscape image, an architectural image, etc.

Figure 4:
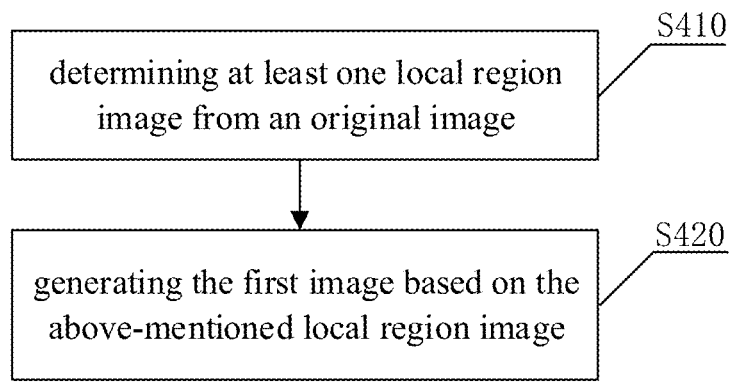
FIG. 4 is a flowchart of an operation of generating a first image according to an embodiment of the present disclosure.

In some embodiments, as shown in FIG. 4, the operation at block S310 may include operations at block S410 and block S420.

At block S410, determining at least one local region image from an original image.

At block S420, generating the first image based on the above-mentioned local region image.

The original image is an initial image used to generate the first image, which may be an image captured or selected by the user, or an image automatically specified by the system. For example: acquiring the original image in response to a preset operation of the user. The preset operation may include: controlling a camera to capture the original image, for example, the user opens a photo-capturing interface, and uses a preview image acquired by the camera as the original image, or the user captures an image as the original image; selecting the original image in a local image library or an application program, the local image library is another image library different from the above-mentioned preset image library, such as a photo album in the mobile phone. Specifically, the user may select an image in the local photo album of the mobile phone as the original image, or select an image in an application program (an image sent by another user, an image in a program page, etc.) as the original image, etc. Thus, it is guaranteed that, the original image satisfies the user's preferences.

The user specifies theme switching rules for the background image in advance. For example, the theme is switched according to time, weather, etc. As a result, the system may obtain a matching original image based on the current time, weather, etc. For example, if the current date is Aug. 20, 2020, an image taken on Aug. 20, 2019 may be used as the original image. If the current date is a rainy day, an image with a rain theme may be found on the Internet, or an image related to rain in an album may be used as the original image, etc. This enables automatic selection of original images and simplifies user operations.

The process in FIG. 4 actually acquires a shot or screenshot of the original image, and generates the first image based on the acquired local region image. Since the original image usually contains more image contents, by acquiring the local region image from the original image, it is possible to obtain an image with purer contents and a single subject.

In some embodiments, at least one local region image may be determined in response to the user selecting a box-region or framing a region in the original image. The operation of selecting the box-area means that, the user selects or draws a box-region (generally a rectangular frame) from the original image as the local region. That is, the user is allowed to take a manual screenshot or shot in the original image, and the user is supported to acquire a plurality of local region images at the same time. In this way, the user may acquire a local region image that he or she prefers to be used as a reference for subsequent generation of the background image.

In some embodiments, the content of the original image may also be recognized, and the local region image may be segmented out, cut out, cropped out or extracted. For example, a foreground portion is recognized from the original image, and the local region image where the foreground portion is located is cropped out or extracted.

After being obtained, the local region image may be used directly as the first image, or may be further processed to obtain the first image.

Figure 5:
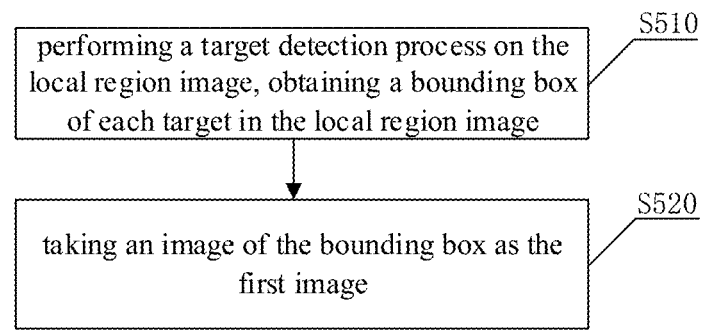
FIG. 5 is a flowchart of an operation of taking the first image according to an embodiment of the present disclosure.

In some embodiments, as shown in FIG. 5, the operation at block S420 may include operations at block S510 and block S520.

At block S510, performing a target detection process on the local region image, to obtain a bounding box of each target in the local region image.

At block S520, taking an image of the bounding box as the first image.

The target may be any recognizable entity in the image, such as a plant, a building, a vehicle, etc. Generally, when the user manually takes or screenshots the local region image, there may be errors that make the local region image to contain irrelevant elements other than the target. After processing the local region image by the method of FIG. 5, a pure image regarding the target may be obtained. The target detection may be achieved by algorithm models such as YOLO (You Only Look Once, an algorithm for real-time target detection, including versions v1, v2, v3, etc., and any version may be used in the present disclosure), SSD (Single Shot MultiBox Detector), etc., which output a bounding box (or may be referred to as a bounding frame) of the target in the local region image. The first image is obtained by taking, cutting out, or screenshotting the image inside the bounding box. This process is equivalent to perform a finer screenshot on the basis of the local region image, and obtain the first image with the target as the main content. In this way, the accuracy of the first image is improved, and an interference caused by irrelevant contents to the subsequent processing is reduced.

It should be noted that, when the local region image includes a plurality of targets, the bounding box of each target may be output separately. In view of this, it is possible to acquire a shot or screenshot of each bounding box separately, so as to obtain a plurality of first images. It is also possible to screen these bounding boxes, e.g.: cutting out or taking only the image of the bounding box with the largest area as the first image, i.e., generating only one first image; retaining the bounding box with an area greater than a certain threshold, and cutting out or taking its image as the first image; manually selecting, by the user, one or more bounding boxes of all the bounding boxes, and cutting out or taking its or their image(s) as the first image, etc. These are not limited in the present disclosure.

In some embodiments, the operation at block S510 may be achieved by the following operations: performing target detection on the local region image, and generating a candidate box for each target in the local region image; and merging candidate boxes of the same target, to obtain the bounding box of each target in the local region image.

When detecting targets in an image, algorithms such as NMS (Non-Maximum Suppression) may be used, in which a detection box traverses through the whole image. The optimal or locally optimal detection box in the image may be selected as the candidate box. For one same target, more than one candidate boxes may be obtained, which is usually caused by error of recognition of the edge of the target. This is especially the case for a target with less prominent edge features, whose number of candidate boxes is generally greater.

In view of this, the candidate boxes of the same target may be merged to obtain the final bounding box, and the accuracy of the bounding box as well as the first image may be improved. The present disclosure does not limit the specific way of merging candidate boxes. By way of example, maximum merging may be used. In a maximum merging process: obtaining coordinates of each corner point of the candidate boxes of the same target in the local region image; among the coordinates of each corner point, selecting the smallest horizontal coordinate and the smallest vertical coordinate to form the lower left corner point, and selecting the greatest horizontal coordinate and the greatest vertical coordinate to form the upper right corner point; and determining the rectangular bounding box in the local region image based on the lower left corner point and the upper right corner point. The line connecting the lower left corner point and the upper right corner point is usually taken as a diagonal line to determine the rectangular region. The rectangular region is the bounding box of the above-mentioned target. It is also possible to use average merging. During the average merging process, calculating the average value of the lower left corner points of all the candidate boxes, and calculating the average value of the upper right corner points of all the candidate boxes. The line connecting the two average points is taken as a diagonal line to determine the rectangular area. The rectangular area is the bounding box of the target.

Figure 6:
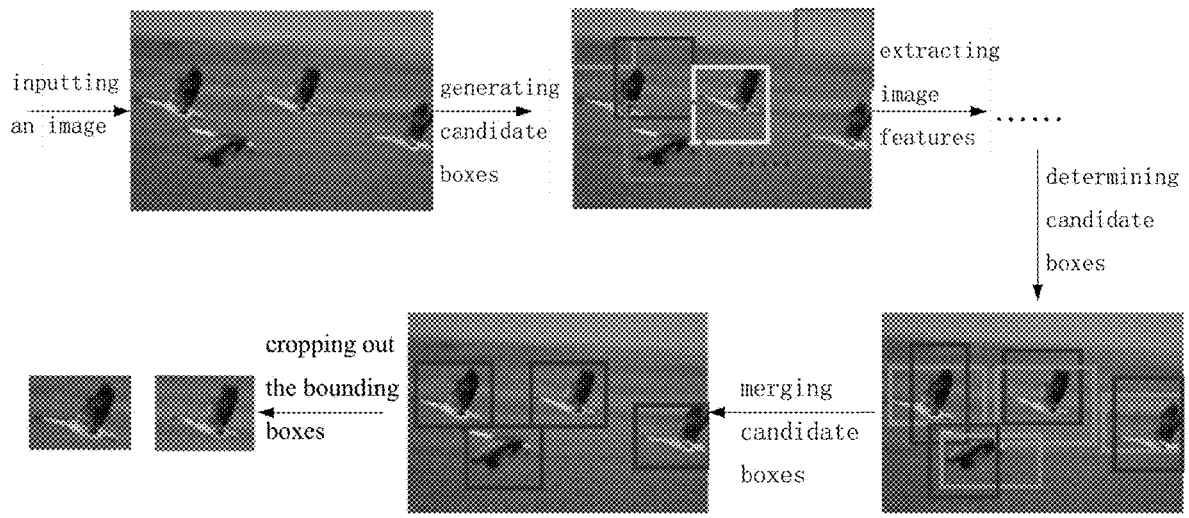
FIG. 6 is a schematic diagram of an operation of generating the first image according to an embodiment of the present disclosure.

FIG. 6 illustrates the process of target detection using the MobileNet-SSD network (a lightweight SSD network model for the mobile terminal) as an example. The target detection process may include: feeding the local region image into the MobileNet-SSD network, and generating a plurality of candidate boxes of different sizes; and extracting features from the image through the network, specifically, performing feature extraction and recognition process on the image of each candidate box, excluding the candidate boxes of the background portion, optimizing the positions and sizes of the candidate boxes containing the target; determining the candidate boxes containing the target, usually one target may correspond to more than one candidate boxes; merging the candidate boxes corresponding to the same target, and obtaining the bounding box corresponding to each target; and taking or cutting out the images of the bounding boxes, to obtain the first images.

As further shown in FIG. 3, at block S320, searching the second image matching the first image in the preset image library.

The preset image library is a standardized image library established in advance. The term "standardized" here mainly means that, the images in the standardized image library have pure contents, single themes, and distinct style, are free from defects such as jitter and noise in images captured in daily life, and suitable for use as background images. In some embodiments, a preset image library of different styles may be established, such as an image library of illustration-style, an image library of animation-style, an image library of really photographed landscape, etc. In some embodiments, the preset image library may include a vector image library, such as an image library formed by images in SVG (Scalable Vector Graphics) format. A vector image can take on the style of graphic illustrations, and are particularly suitable for forming flat background images.

There may be various defects in a first image, such as noise, impure content, unclear image, etc., thus searching a second image matching the first image in the preset image library is equivalent to replacing the first image with a "defect-free" standardized image.

In some embodiments, a similarity between the first image and the images in the preset image library may be calculated, and the image with the highest similarity may be identified as the second image matching the first image. For example, the SSIM (Structural Similarity) is calculated for the first image and the images in the preset image library. In some embodiments, features are extracted from the first image and the images in the preset image library respectively, then the cosine similarity or Euclidean distance of the two feature vectors is calculated, etc.

Figure 7:
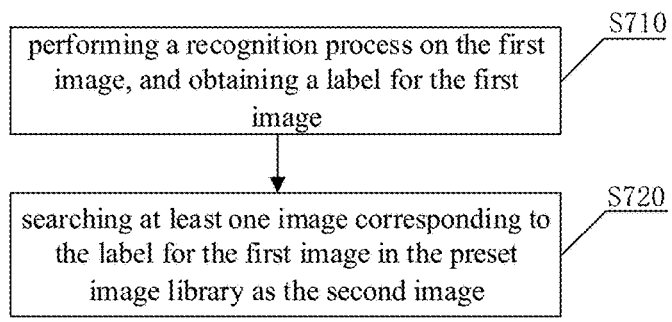
FIG. 7 is a flowchart of an operation of searching a second image according to an embodiment of the present disclosure.

In some embodiments, as shown in FIG. 7, the operation at block S320 may include operations at block S710 and block S720.

At block S710, performing a recognition process on the first image, and obtaining a label for the first image.

At block S720, searching at least one image corresponding to the label for the first image in the preset image library as the second image.

The image recognition process may be implemented by an image classification algorithm, such as the MobileNet classifier, and the resulted label is the category label or class label that classifies the first image. As a result, the images with the same label are screened out from the preset image library. The second image is seared for in the images with the same label. For example, the second image may be searched for based on the image similarity. In other words, the second image should belong to the same category or class as the first image. In this way, the scope of the preset image library for searching for the second image may be narrowed, and the accuracy of the searching result may be increased.

In some embodiments, in order to achieve more accurate search, an image may be provided with multiple levels of labels, from coarse classification to fine classification. For example, the first image may include a first-level label and a second-level label. During the recognition process, a first-level recognition process may be performed on the first image, to obtain a first-level label of the first image. Then, under this first-level label, a second-level recognition process may be performed on the first image, to obtain a second-level label of the first image.

Figure 8:
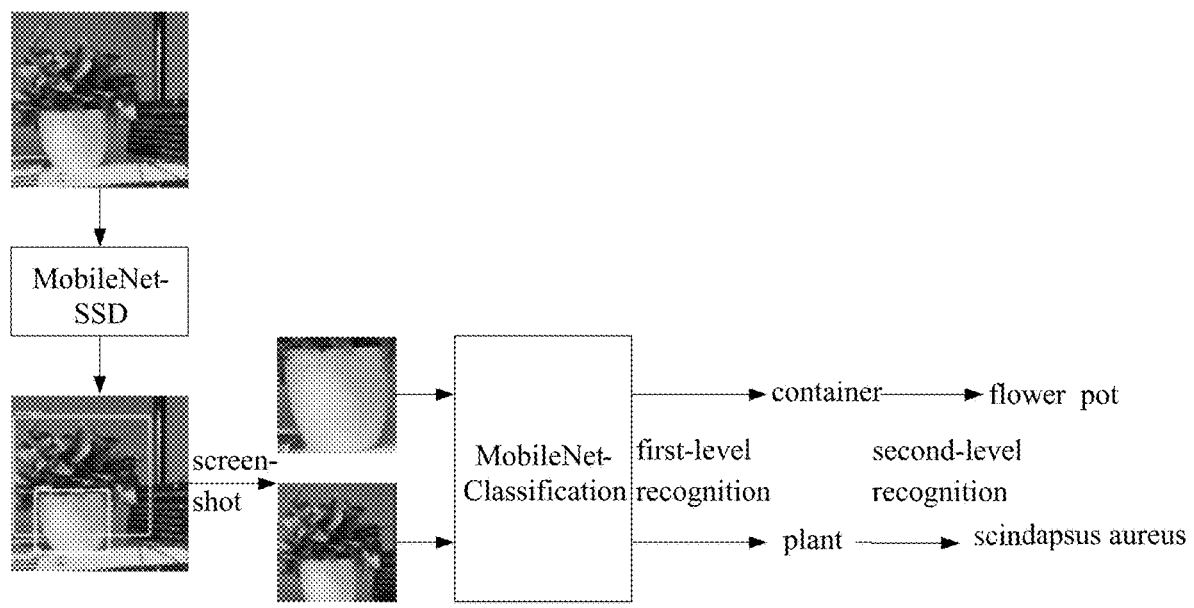
FIG. 8 is a schematic diagram of an operation of performing an image recognition process according to an embodiment of the present disclosure.

Take FIG. 8 as an example, the local region image is input to the single shot multibox detector (MobileNet-SSD) of a lightweight backbone network, and the bounding box of the target is determined and cropped out to obtain two first images. Each of the two first images is input to a classifier (MobileNet-Classification) of the lightweight backbone network, a first level of recognition process is performed first to obtain a first-level label. The first-level label is for example a "container" or a "plant". Then a second level of recognition process is performed under each first-level label to obtain a second-level label. The second-level label is for example a "flower pot" or a "*Scindapsus aureus*". It should be noted that, when the second level of recognition process is performed, the first-level label is equivalent to a priori information and helps to improve the accuracy of the second-level recognition process. In some embodiments, during the second level of recognition process, different sub-networks may be used. Each sub-network corresponds to a kind of first-level label. When the first level of label is different, the sub-network used may also be different. In this way, a more targeted recognition process may be achieved.

Based on the division and recognition of the above-mentioned multi-level labels, the last-level label of the first image, such as the second-level label, is obtained. When searching the second image, at least one image corresponding to the last level label of the first image may be found in the preset image library. Take the image of "*Scindapsus aureus*" in FIG. 8 as an example, after its second-level label "*Scindapsus aureus*" is recognized, images with the label "*Scindapsus aureus*" may be screened out from the preset image library, the second image may be further obtained from these images.

As further shown in FIG. 3, at block S330, performing the color-modulation process on the second image based on the first image, and generating the background image.

In short, the hue or color tone of the first image is applied to the second image. For example, the green color of the *Scindapsus aureus* in the first image is different from the color of the green leaves in the second image, the green color in the second image may be replaced with the green color in the first image, to better match the user's preference.

In some embodiments, the operations at block S330 may include the following operations: determining, based on the number of principal colors in the first image, a number of layers in the second image as target layers in the second image, the number of layers in the second image is the same as the number of principal colors in the first image; and replacing the color of each target layer in the second image with the principal color of the first image.

The principal color of the first image may be one or more colors account for the highest percentage (meaning the percentage of pixels) in the first image. For example, one kind of color accounts for the highest percentage is selected as the principal color, or three kinds of colors account for the highest percentage are selected as the principal colors, or a plurality of colors taking more than 20% percentage are selected as the principal colors, etc. The present disclosure does not limit this.

The target layer in the second image may be the main layer in the second image, such as the layer of the foreground part. In a vector graphic, the image is generally formed by superimposing or laminating a plurality of layers together. Different layers are arranged in an order or a sequence from the foreground to the background. One or more layers rank the top of the sequence may be selected as the target layer(s).

After determining the principal color of the first image and the target layer of the second image, the principal color may be filled into the target layer, to replace the original color of the target layer.

In some embodiments, the color-modulation process may include the following operations: sorting each principal color of the first image according to a proportion of each principal color accounts for in the first image; determining the sorting order of the target layers in the second image; determining the corresponding relationship between the above-mentioned principal colors and the target layers according to the sorting order of the above-mentioned principal colors and the sorting order of the above-mentioned target layers, replacing the color of each target layer with corresponding principal color.

For example, 3 principal colors are extracted from the first image. In descending orders of the proportions the principal colors account for, the 3 principal colors are denoted as the principal color 1, the principal color 2 and the principal color 3 respectively. In the second image, the three layers that ranked the top three are selected as the target layers, and are denoted as the layer 1, the layer 2 and the layer 3 respectively according to their sorting order. Then all the colors in layer 1 are replaced with the principal color 1, all the colors in layer 2 are replaced with the principal color 3, all the colors in layer 3 are replaced with the principal color 3, and an image having a very similar color style to the first image is thus obtained as the final background image. In this way, the colors of the first image and the contents of the second image are combined, the user's preference is better matched.

Figure 9:
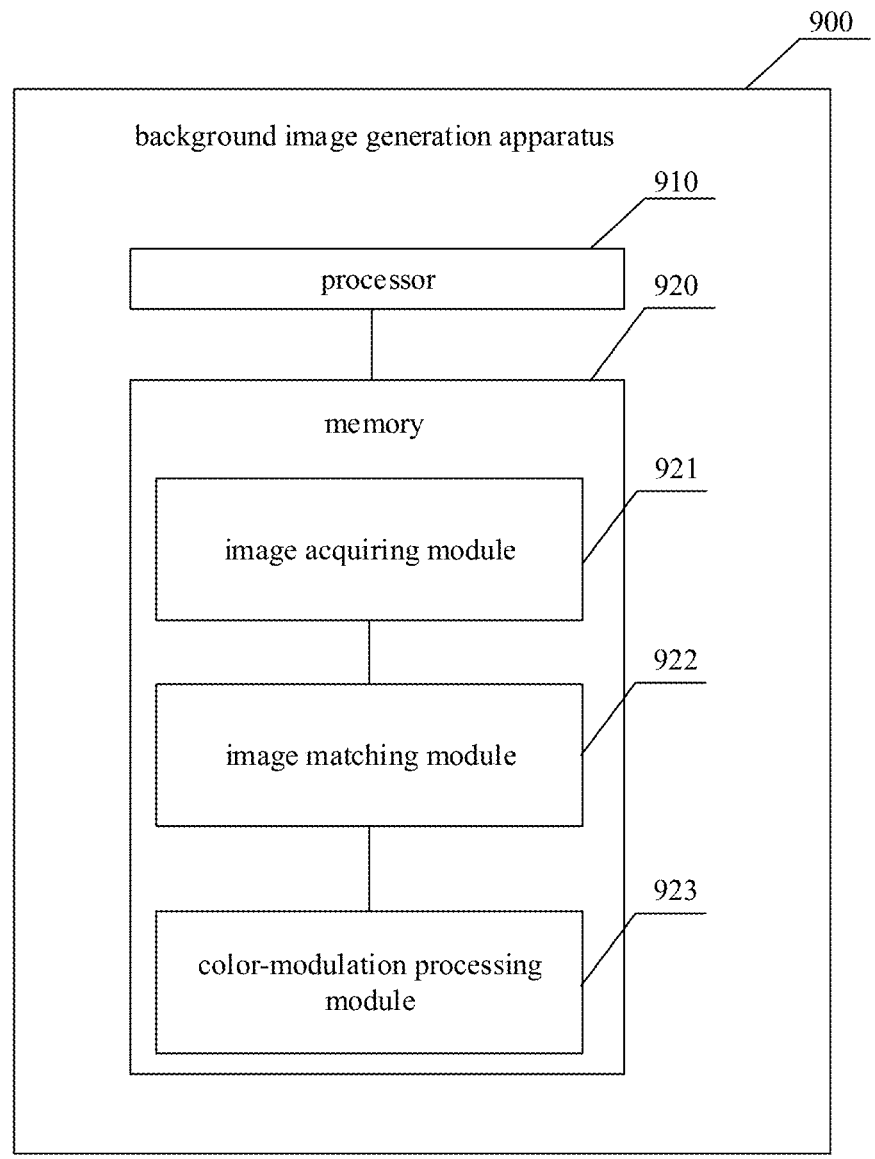
FIG. 9 is a structural block diagram of a background image generation apparatus according to an embodiment of the present disclosure.

In some embodiments of the present disclosure, a background image generation apparatus is also provided. As shown in FIG. 9, the background image generation apparatus 900 may include a processor 910 and a memory 920. Program modules are stored in the memory 920. The program modules may include: an image acquiring module 921 configured for acquiring the first image; an image matching module 922 configured for searching the second image matching the first image in the preset image library; a color-modulation processing module 923 configured for generating the background image by performing the color-modulation process on the second image based on the first image. The processor 910 is configured to implement each of the above program modules.

In some embodiments, the image acquiring module 921 is configured for: determining at least one local region image from the original image; and generating the first image based on the above-mentioned local region image.

In some embodiments, the image acquiring module 921 is also configured for: acquiring the original image in response to the preset operation of the user.

In some embodiments, the preset operation includes: controlling the camera to capture the original image, or selecting the original image in the local image library or an application program.

In some embodiments, the above-mentioned operation of determining at least one local region image from the original image includes: determining at least one local region image in response to an operation of selecting a box-region or framing a region performed by the user in the original image.

In some embodiments, the above-mentioned operations of generating the first image based on the local region image includes: performing the target detection process on the local region image, and obtaining the bounding box of each target in the local region image; taking or cutting out the image of the bounding box as the first image.

In some embodiments, the above-mentioned operation of performing the target detection process on the local region image, and obtaining the bounding box of each target in the local region image includes: performing the target detection process on the local region image, and generating the candidate box for each target in the local region image; and merging the candidate boxes of the same target, and obtaining the bounding box of each target in the local region image.

In some embodiments, the above-mentioned operations of merging the candidate boxes of the same target, and obtaining the bounding box of each target in the local region image includes: obtaining coordinates of each corner point of the candidate boxes of the same target in the local region image; among the coordinates of all the corner points, selecting the smallest horizontal coordinate and the smallest vertical coordinate to form the lower left corner point, and selecting the greatest horizontal coordinate and the greatest vertical coordinate to form the upper right corner point; and determining the rectangular bounding box in the local region image based on the above-mentioned lower left corner point and the upper right corner point.

In some embodiments, the above-mentioned operation of cutting out or taking the image of the bounding box as the first image includes: taking the image of the bounding box with the largest area as the first image.

In some embodiments, the image matching module 922 is configured for: calculating the similarity between the first image and the images in the preset image library, and identifying the image with the highest similarity as the second image matching the first image.

In some embodiments, the image matching module 922 is configured for: performing the recognition process on the first image, and obtaining the label for the first image; and searching at least one image corresponding to the label for the first image in the preset image library as the second image.

In some embodiments, the labels of the first image include a first-level label and a second-level label. The above-mentioned operation of performing the recognition process on the first image, and obtaining the label for the first image includes: performing the first-level recognition process on the first image, and obtaining the first-level label for the first image; under this first-level label, performing the second-level recognition process on the first image, and obtaining the second-level label of the first image.

In some embodiments, the above-mentioned operation of searching at least one image corresponding to the label for the first image in the preset image library includes: searching at least one image corresponding to the second-level label for the first image in the preset image library.

In some embodiments, the color-modulation processing module 923 is configured for: determining, based on the number of principal colors in the first image, a number of layers in the second image as target layers in the second image, the number of layers in the second image being the same as the number of principal colors in the first image; and replacing the color of the target layer in the second image with the principal color of the first image.

In some embodiments, the above-mentioned operation of replacing the color of the target layer in the second image with the principal color of the first image includes: sorting each principal color of the first image according to the proportion of each principal color accounts for in the first image; determining the sorting order of the target layers in the second image; determining the corresponding relationship between the above-mentioned principal colors and the target layers according to the sorting order of the above-mentioned principal colors and the sorting order of the above-mentioned target layers, replacing the color of each target layer with corresponding principal color.

In some embodiments, the principal color of the first image is one or more colors account for the highest percentage in the first image.

In some embodiments, the preset image library includes a vector image library.

Figure 10:
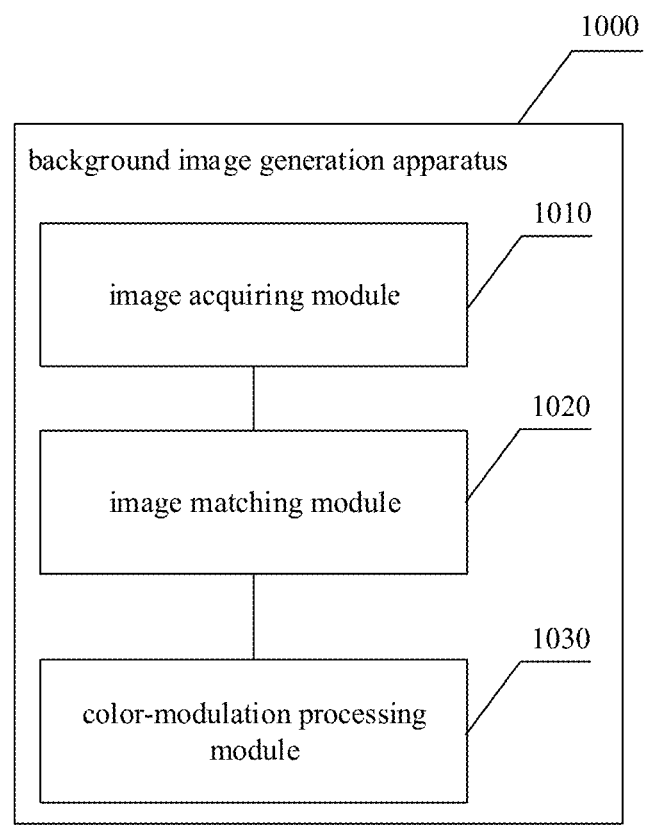
FIG. 10 is a structural block diagram of a background image generation apparatus according to another embodiment of the present disclosure.

In some embodiments of the present disclosure, another background image generation apparatus is also provided. As shown in FIG. 10, the background image generation apparatus 1000 may include: an image acquiring module 1010 configured for acquiring the first image; an image matching module 1020 configured for searching the second image matching the first image in the preset image library; an color-modulation processing module 1030 configured for generating the background image by performing the color-modulation process on the second image based on the first image.

In some embodiments, the image acquiring module 1010 is configured for: determining at least one local region image from the original image; and generating the first image based on the above-mentioned local region image.

In some embodiments, the image acquiring module 1010 is also configured for: acquiring the original image in response to the preset operation of the user.

In some embodiments, the above-mentioned preset operation includes: controlling the camera to capture the original image, or selecting the original image in the local image library or the application program.

In some embodiments, the above-mentioned operation of determining at least one local region image from the original image includes: determining at least one local region image in response to an operation of selecting a box-region or framing a region performed by the user in the original image.

In some embodiments, the above-mentioned operations of generating the first image based on the local region image includes: performing the target detection process on the local region image, and obtaining the bounding box of each target in the local region image; taking or cutting out the image of the bounding box, as the first image.

In some embodiments, the above-mentioned operation of performing the target detection process on the local region image, and obtaining the bounding box of each target in the local region image includes: performing the target detection on the local region image, and generating the candidate boxes for each target in the local region image; and merging the candidate boxes of the same target, and obtaining the bounding box of each target in the local region image.

In some embodiments, the above-mentioned operations of merging the candidate boxes of the same target, and obtaining the bounding box of each target in the local region image includes: obtaining coordinates of each corner point of the candidate boxes of the same target in the local region image; among the coordinates of all the corner points, selecting the smallest horizontal coordinate and the smallest vertical coordinate to form the lower left corner point, and selecting the greatest horizontal coordinate and the greatest vertical coordinate to form the upper right corner point; and determining the rectangular bounding box in the local region image based on the above-mentioned lower left corner point and the upper right corner point.

In some embodiments, the above-mentioned operation of taking or cutting out the image of the bounding box as the first image includes: cutting out the image of the bounding box with the largest area as the first image.

In some embodiments, the image matching module 1020 is configured for: calculating the similarity between the first image and the images in the preset image library, and identifying the image with the highest similarity as the second image matching the first image.

In some embodiments, the image matching module 1020 is configured for: performing the recognition process on the first image, and obtaining the label for the first image; and searching at least one image corresponding to the label for the first image in the preset image library as the second image.

In some embodiments, the labels of the first image include the first-level label and the second-level label. The above-mentioned operation of performing the recognition process on the first image, and obtaining the label for the first image includes: performing the first-level recognition process on the first image, and obtaining the first-level label for the first image; and under the first-level label, performing the second-level recognition process on the first image, and obtaining the second-level label of the first image.

In some embodiments, the above-mentioned operation of searching at least one image corresponding to the label for the first image in the preset image library includes: searching at least one image corresponding to the second-level label for the first image in the preset image library.

In some embodiments, the color-modulation processing module 1030 is configured for: determining, based on the number of principal colors in the first image, a number of layers in the second image as target layers in the second image, the number of layers in the second image is the same as the number of principal colors in the first image; and replacing the color of each target layer in the second image with the principal color of the first image.

In some embodiments, the above-mentioned operation of replacing the color of each target layer in the second image with the principal color of the first image includes: sorting each principal color of the first image according to a proportion of each principal color accounts for in the first image; determining the sorting order of the target layers in the second image; determining the corresponding relationship between the above-mentioned principal colors and the target layers according to the sorting order of the above-mentioned principal colors and the sorting order of the above-mentioned target layers, replacing the color of each target layer with corresponding principal color.

In some embodiments, the principal color of the first image is one or more colors accounts for the highest percentage in the first image.

In some embodiments, the preset image library includes the vector image library.

The specific details of each part of the above apparatus have been described in detail in the method section implementation and thus will not be repeated.

Exemplary embodiments of the present disclosure also provide a computer-readable storage medium that may be implemented in the form of a program product. The program product includes program codes. When the program product is running on a terminal device, the program codes are configured to cause the terminal device to implement the operations described above in the "DETAILED DESCRIPTION" section of the specification according to various exemplary embodiments of the present disclosure. For example, any one or more of the operations shown in FIG. 3, FIG. 4, FIG. 5, or FIG. 7 may be implemented. The program product may take the form of a portable compact disk read-only memory (CD-ROM), and include program codes. The program product may run on a terminal device, such as on a personal computer. However, the program products of the present disclosure are not limited thereto. In the present disclosure, the readable storage medium may be any tangible medium that contains or stores a program. The program may be used by or in combination with an instruction executing system, a device or an apparatus.

The program product can use any combination of one or more readable mediums. The readable medium may be a readable signal medium or a readable storage medium. The readable storage medium may be, for example, but not limited to, an electrical, a magnetic, an optical, an electromagnetic, an infrared, or a semiconductor system, apparatus, or device, or any combination thereof. More specific examples of readable storage mediums (a non-exhaustive list) include: an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic memory device or any suitable combination of the above.

A computer-readable signal medium may include a data signal propagated in a baseband or as a part of a carrier wave. The data signal carries readable program codes. The propagated data signal may take a variety of forms, including but not limited to electromagnetic signals, optical signals or any suitable combination of the above. The readable signal medium may also be any readable medium other than a readable storage medium. The readable medium may send, propagate, or transmit a program for used by or in combination with an instruction execution system, a device, or an apparatus.

The program codes contained on the readable medium may be transmitted using any suitable medium, including but not limited to a wireless, a wired, an optical cable, RF, etc., or any suitable combination thereof.

Program codes for performing the operations of the present disclosure may be written in any combination of one or more programming languages. The programming languages may include object-oriented programming languages, conventional procedural programming languages or similar programming languages. The object-oriented programming languages may for example be Java, C++, etc. The conventional procedural programming languages may for example be "C" language. The program codes may be executed entirely on the user computing device, partially on the user device, as a stand-alone software package, partially on the user computing device and partially on a remote computing device, or entirely on the remote computing device or a server. In the case involving a remote computing device, the remote computing device may be connected to the user computing device via any type of networks, including a local area network (LAN) or a wide area network (WAN). In some embodiments, the remote computing device may be connected to an external computing device (e.g., the connection is via the Internet with the help of an Internet service provider). Those skilled in the art will understand that, aspects of the present disclosure may be implemented as systems, methods or program products. Therefore, various aspects of the present disclosure may be specifically implemented in one of the following forms: a full hardware implementation, a full software implementation (including firmware, microcode, etc.), or a combination of hardware and software aspects, which may be collectively referred to herein as a "circuit," a "module" or a "system".

Other embodiments of the present disclosure will readily occur to the minds of those skilled in the art upon consideration of the specification and practice of what is disclosed herein. The present disclosure is intended to cover any variations, applications, or adaptive changes of the present disclosure. These variations, applications or adaptive changes may follow the general principle of the present disclosure, and include well known knowledge or customary technical schemes in the art that are not disclosed herein. The specification and embodiments should merely be considered as exemplary, and the true scope and spirit of the present disclosure is defined by the claims.

It should be appreciated that, the present disclosure is not limited to the precise structures already described above and illustrated in the accompanying drawings, and various modifications and changes may be made without departing from the scope of the present disclosure. The scope of the present disclosure is only defined by the accompanying claim set.

What is claimed is:

1. A background image generation method, comprising:
   acquiring a first image;
   searching a second image matching the first image in a preset image library; and
   performing, according to the first image, a color-modulation process on the second image, and generating a background image,
   wherein the operation of performing, according to the first image, the color-modulation process on the second image comprises:
   applying a color tone of the first image to the second image,
   wherein the operation of applying the color tone of the first image to the second image comprises:
   determining, based on a number of principal colors in the first image, a number of layers in the second image as target layers in the second image, a number of layers being the same as the number of the principal colors in the first image; and
   replacing colors of the target layers in the second image with the principal colors of the first image.

2. The method as claimed in claim 1, wherein the operation of acquiring the first image comprises:
   determining at least one local region image from an original image; and
   generating the first image based on the local region image.

3. The method as claimed in claim 2, further comprising:
   acquiring, in response to a preset operation of a user, the original image,
   wherein the preset operation comprises:
   controlling a camera to capture the original image, or selecting the original image in a local image library or from an application program.

4. The method as claimed in claim 2, wherein the operation of determining at least one local region image from the original image comprises:
   determining, in response to an operation of selecting a box-region performed by a user in the original image, at least one local region image.

5. The method as claimed in claim 2, wherein the operation of generating the first image based on the local region image comprises:
   performing a target detection process on the local region image, and obtaining a bounding box of each target in the local region image; and
   taking an image of the bounding box as the first image.

6. The method as claimed in claim 5, wherein the operation of performing the target detection process on the local region image, and obtaining the bounding box of each target in the local region image comprises:
   performing target detection on the local region image, and generating a candidate box for each target in the local region image; and
   merging the candidate boxes of a same target, and obtaining the bounding box of each target in the local region image.

7. The method as claimed in claim 5, wherein the operation of taking the image of the bounding box as the first image comprises:
   screening out, in response to the local region image comprising a plurality of targets, one or more bounding boxes from a plurality of bounding boxes, taking an image of each of the one or more bounding boxes as the first image, comprising one of:
   taking an image of a bounding box with a largest area as the first image;
   taking the image of each of the one or more bounding box with an area greater than a certain threshold as the first image; and
   manually selecting, by a user, one or more bounding boxes, and taking an image of each of the one or more bounding boxes as the first image.

8. The method as claimed in claim 5, wherein the operation of performing the target detection process on the local region image, and obtaining the bounding box of each target in the local region image comprises:
   acquiring, in response to the local region image comprising a plurality of targets, a screenshot of each bounding box and obtaining a plurality of first images.

9. The method as claimed in claim 2, wherein the operation of determining at least one local region image from the original image comprises:
recognizing content of the original image, and cropping out at least one local region image.

10. The method as claimed in claim 1, wherein the operation of searching the second image matching the first image in the preset image library comprises:
calculating a similarity between the first image and images in the preset image library, and identifying an image in the preset image library with greatest similarity as the second image matching the first image.

11. The method as claimed in claim 1, wherein the operation of searching the second image matching the first image in the preset image library comprises:
performing a recognition process on the first image, and obtaining a label for the first image; and
searching at least one image corresponding to the label for the first image in the preset image library as the second image.

12. The method as claimed in claim 11, wherein the label for the first image comprises a first-level label and a second-level label;
wherein the operation of performing the recognition process on the first image, and obtaining the label for the first image comprises:
performing a first-level recognition process on the first image, and obtaining a first-level label for the first image; and
performing, under the first-level label, a second-level recognition process on the first image, and obtaining a second-level label for the first image,
wherein the operation of searching at least one image corresponding to the label for the first image in the preset image library comprises:
searching at least one image corresponding to the second-level label for the first image in the preset image library.

13. The method as claimed in claim 1, wherein the operation of replacing the colors of the target layers in the second image with the principal colors of the first image comprises:
sorting, according to a proportion that each principal color accounts for in the first image, each principal color of the first image;
determining sorting orders of the target layers in the second image; and
determining, according to sorting order of each principal color and the sorting orders of the target layers, corresponding relationship between the principal colors and the target layers, and replacing a color of each target layer with corresponding principal color.

14. The method as claimed in claim 1, wherein the principal colors of the first image are one or more colors accounting for a greatest percentage in the first image.

15. The method as claimed in claim 1, wherein:
the preset image library is a standardized image library established in advance; or
the preset image library includes a vector image library.

16. An electronic device, comprising:
a processor; and
a memory, configured to store executable instructions of the processor;
wherein the processor is configured to execute a background image generation method when running the executable instructions, the background image generation method comprising:
acquiring a first image;
searching a second image matching the first image in a preset image library; and
performing, according to the first image, a color-modulation process on the second image, and generating a background image,
wherein the operation of performing, according to the first image, the color-modulation process on the second image comprises:
applying a color tone of the first image to the second image,
wherein the operation of applying the color tone of the first image to the second image comprises:
determining, based on a number of principal colors in the first image, a number of layers in the second image as target layers in the second image, a number of layers being the same as the number of the principal colors in the first image; and
replacing colors of the target layers in the second image with the principal colors of the first image.

* * * * *